(12) United States Patent
Bucher et al.

(10) Patent No.: US 9,502,921 B2
(45) Date of Patent: Nov. 22, 2016

(54) CIRCUIT FOR A SYSTEM FOR CONTACTLESS INDUCTIVE POWER TRANSMISSION

(75) Inventors: Alexander Bucher, Nürnberg (DE); Thomas Durbaum, Baiersdorf (DE)

(73) Assignee: FRIEDRICH-ALEXANDER-UNIVERSITÄT ERLANGEN-NÜRNBERG, Erlangen (DE)

( * ) Notice: Subject to any disclaimer, the term of this patent is extended or adjusted under 35 U.S.C. 154(b) by 346 days.

(21) Appl. No.: 13/701,756

(22) PCT Filed: May 27, 2011

(86) PCT No.: PCT/EP2011/002637
§ 371 (c)(1),
(2), (4) Date: Apr. 9, 2013

(87) PCT Pub. No.: WO2011/151038
PCT Pub. Date: Dec. 8, 2011

(65) Prior Publication Data
US 2013/0187595 A1 Jul. 25, 2013

(30) Foreign Application Priority Data
Jun. 2, 2010 (EP) .................... 10005752

(51) Int. Cl.
*H02J 7/00* (2006.01)
*H01F 27/42* (2006.01)
(Continued)

(52) U.S. Cl.
CPC ............... *H02J 7/025* (2013.01); *H02J 5/005* (2013.01); *H04B 5/0037* (2013.01)

(58) Field of Classification Search
CPC ...................................................... H02J 7/025

USPC ........................................................ 320/108
See application file for complete search history.

(56) References Cited

U.S. PATENT DOCUMENTS

| 5,568,036 A | 10/1996 | Hulsey et al. |
| 5,963,210 A | 10/1999 | Lewis et al. |

(Continued)

FOREIGN PATENT DOCUMENTS

| DE | 3902618 | 8/1990 |
| DE | 10158794 | 5/2008 |

(Continued)

OTHER PUBLICATIONS

International Search Report for International Application No. PCT/KR2005/001037 dated Nov. 18, 2005 (2 pages).

(Continued)

*Primary Examiner* — Richard Isla Rodas
*Assistant Examiner* — David V Henze-Gongola
(74) *Attorney, Agent, or Firm* — Michael Best & Friedrich LLP

(57) ABSTRACT

The invention relates to a circuit for a system for contactless, inductive power transmission, in particular for use in supplying power to mobile devices, and to an associated charging circuit. The circuit comprises a primary-side circuit, which is disposed on a primary side and can be connected to a primary-side supply voltage, and a secondary-side circuit, which is disposed on a secondary side and can be connected to a load to be supplied with power. Furthermore a transformer stage having galvanic isolation is provided for the contactless transfer of power from the primary side over an air gap to the secondary side, wherein at least two magnetically coupled coils are provided for inductive power transmission and can be spatially separated from one another by distancing the secondary side from the primary side. The transformer stage has a resonant converter and the secondary-side circuit further comprises a restabilization stage.

13 Claims, 14 Drawing Sheets

(51) Int. Cl.
*H01F 37/00* (2006.01)
*H01F 38/00* (2006.01)
*H02J 7/02* (2016.01)
*H02J 5/00* (2016.01)
*H04B 5/00* (2006.01)

(56) References Cited

U.S. PATENT DOCUMENTS

| | | | |
|---|---|---|---|
| 6,118,249 A | 9/2000 | Brockmann et al. | |
| 6,160,374 A * | 12/2000 | Hayes et al. | 320/108 |
| 6,436,299 B1 | 8/2002 | Baarman et al. | |
| 6,586,909 B1 * | 7/2003 | Trepka | 320/108 |
| 6,683,438 B2 | 1/2004 | Park et al. | |
| 6,912,137 B2 | 6/2005 | Berghegger | |
| 2002/0141208 A1 * | 10/2002 | Nanbu et al. | 363/37 |
| 2002/0167824 A1 * | 11/2002 | Boeke et al. | 363/24 |
| 2003/0227364 A1 | 12/2003 | Li et al. | |
| 2004/0124807 A1 * | 7/2004 | Nakata et al. | 318/801 |
| 2008/0094027 A1 * | 4/2008 | Cho | H02J 7/00 320/108 |
| 2008/0198638 A1 * | 8/2008 | Reinberger | H02M 3/3376 363/74 |
| 2008/0224544 A1 | 9/2008 | Koyama | |
| 2009/0261778 A1 * | 10/2009 | Kook | 320/108 |
| 2009/0290385 A1 * | 11/2009 | Jungreis | H02M 1/4241 363/17 |
| 2010/0171367 A1 * | 7/2010 | Kitamura et al. | 307/104 |
| 2011/0199046 A1 * | 8/2011 | Tsai et al. | 320/108 |
| 2013/0154559 A1 | 6/2013 | Cho | |

FOREIGN PATENT DOCUMENTS

| | | |
|---|---|---|
| EP | 288791 | 11/1993 |
| EP | 982831 | 3/2000 |
| EP | 1221753 | 7/2002 |
| EP | 1744443 | 1/2007 |
| EP | 1780862 | 5/2007 |
| JP | 2002262468 | 9/2002 |
| JP | 2005313884 | 11/2005 |
| JP | 2007124754 | 5/2007 |
| WO | 2006/101285 | 9/2006 |
| WO | 2006101285 | 9/2006 |
| WO | 2007012272 | 2/2007 |

OTHER PUBLICATIONS

Schwalbe, U., "Comparative studies of three-stage switching power supply topologies in the output power up to 3 kW" Nov. 11, 2008, Erfurt, Germany (247 pages).

Japanese Notice of Reasons for Rejection for Japanese Application No. 2013-512787 dated Jan. 7, 2014 (8 pages).

International Search Report for International Application No. PCT/EP2011/002637 dated Oct. 18, 2011 (3 pages).

Chinese Patent Office Action for Application No. 201180038028.9 dated Oct. 10, 2014 (17 pages, English translation included).

International Search Report for Application No. PCT/EP2011/002637 dated Oct. 18, 2011 (English Translation and Original, 6 pages).

* cited by examiner

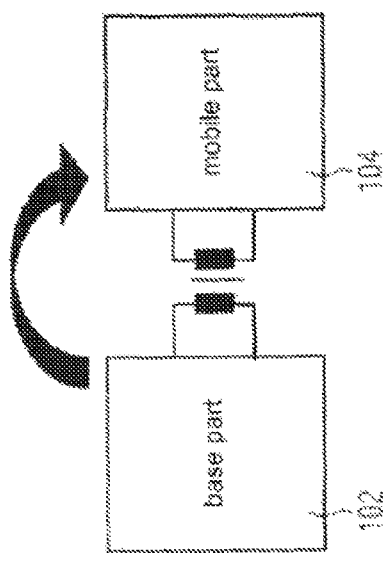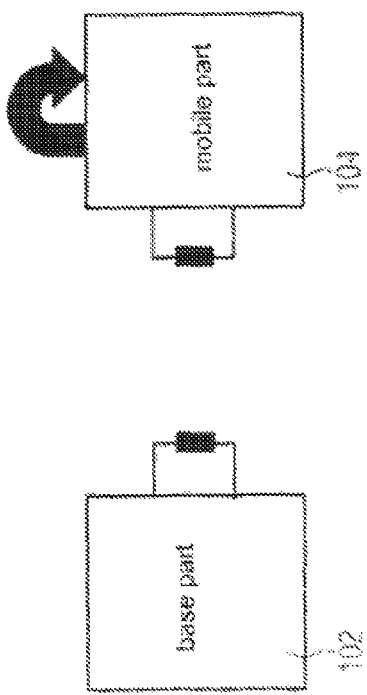
FIG. 1a (Prior Art)
FIG. 1b (Prior Art)

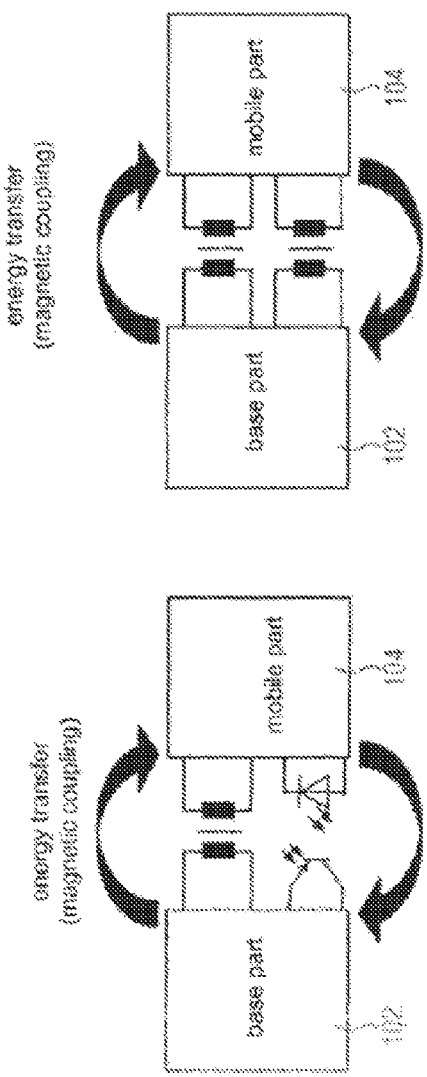
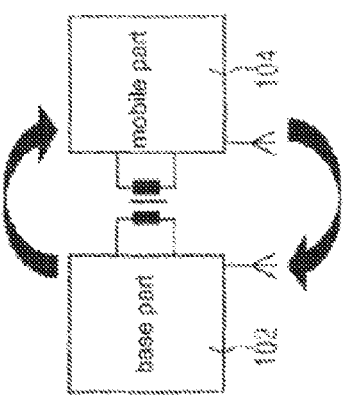
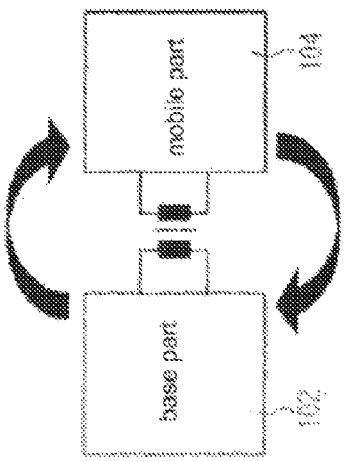
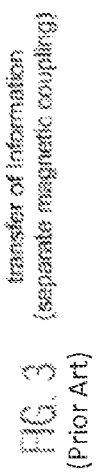
FIG. 2a (Prior Art)
FIG. 2b (Prior Art)
FIG. 3 (Prior Art)
FIG. 4 (Prior Art)

CIRCUIT FOR A SYSTEM FOR CONTACTLESS INDUCTIVE POWER TRANSMISSION

BACKGROUND OF THE INVENTION

The present invention is related to a circuit for a system of contactless inductive energy transfer, especially for application in energy supply of mobile devices as well as a related charging circuit.

The principle of inductive energy transfer serves in a plurality of applications as physical basis of technical development of a further field of applications. The principle division of a system for inductive energy transfer is shown in FIG. 1. An essential element in case of a contactless inductive energy transfer is a loosely coupled conductor, which represents magnetic coupling of an inductor in the base part with an inductor in the mobile part on a circuit device base. In operating condition of FIG. 1a, energy transfer between base part and mobile part takes place. This energy can be utilized on the one hand to enable functionality of the mobile part, and on the other hand can be buffered in accumulator batteries (for modern applications mostly Li-ion accumulators, although further types of accumulator batteries like lead-, NiCd-, NiMh-types can be used). If the mobile part 104 is removed from the base part 102 as shown in FIG. 1b, the energy transfer is interrupted. The mobile part 104 is then supplied by the previously charged internal energy storage or remains in inactive state until the next contact with the base part 102.

Due to the special arrangement of the mobile part 104 close to the base part 102, energy transfer between the base part and the mobile part is made possible. The most popular example of such an inductive charging system is the electric toothbrush, which enables charging of the toothbrush as mobile part 104 without galvanic connection.

Omission of galvanic leads is of great importance for manifold usage scenarios. This applies specifically to applications with high demands in the mechanical set up of the electric connections between the power source and sink in which technically complex plugs and cables can be avoided by application of inductive energy transfer (IE). Further, technical energy supply system components based on IE can be protected from environmental impacts without making the mechanical set up unnecessarily complex by appliance of outsourced connectors. Moreover, existing areas of operation for IE in which application of galvanic connections in view of technical feasibility has to be avoided, for example in explosion prone environments or during operation of the system components in conductive and or aggressive media. Furthermore, the use of IE can improve the reliability of technical systems. This is the case on the one hand for systems with rotating or moveable parts since wiper contacts that are prone to attrition can be omitted and on the other hand in devices with connectors which in any other case would have to be dimensioned for a plurality of plugs.

In connection with the increasing penetration of the market by technical solutions based on the principles of IE, the aspect of user friendliness should be emphasized. Especially in the field of portable electrical power sinks, this additional value due to the simplified handling becomes apparent for the user which can initiate supply of these portable devices by only placing the mobile part at the charging station.

The present state of the art mostly includes a signal feedback between power sink and power source in applications of IE due to which the present electric state of the galvanically separated secondary side is known in some form on the primary side. This information is used on the primary side by changing a control value (switching frequency duty cycle etc) on the primary side in order to answer to a change in the load on the secondary side. This technical approach requires provision of a channel for information transfer. Known technical realizations, for example DE 3902618 A1, DE 10158794 B4 and U.S. Pat. No. 6,912,137 B2 use a separate physical channel for this signal feedback as shown in FIG. 2.

From a technical set up point of view, this approach is sophisticated because constructive limitations have to be accepted (alignment of the mobile part in relation to the base part can only take place to a limited extent, in case of an optical path providing the optical components or optical fibers outside respectively utilizing transparent materials is necessary, in case of separate magnetic couplings a second inductor pair is indispensible) and further additional expenditure of components and circuits arises.

Alternative approaches use the same magnetic coupling for the signal feedback as for the energy transfer itself (EP288791 B1, EP 982831 A2). This approach is shown in FIG. 3. This known way of feedback is to be seen as disadvantageous in view of construction of the primary and secondary side windings since these have to be adopted for transmitting signal information as well as for the energy transfer.

A further alternative solution exists in utilizsation of wirelessly supported solutions (for example U.S. Pat. No. 6,436,299 B1) based on the propagation of electromagnetic waves. FIG. 4 depicts this possibility.

This technical solution also constitutes an increased technical constructive effort. The necessary components for provision of the wireless channel on the one hand have to be placed in the parts of the devices especially the antennas have to be placed appropriate to one another. Due to this, limitations during operation occur in view of the alignment of the parts of the devices to one another. Moreover, the telecommunication reconditioning of the radio signal increases the circuit device effort.

In case that a channel for information exchange between the base part and the mobile part is available, different modulation schemes (fm, am, etc) are deployed in the existing technical solutions. This telecommunicational conditioning results in an increased demand in the technical realization of the system independent of the kind of the used channel. This is an additional serious disadvantage of known solutions based on the feedback of a signal.

The principle construction of the power part of a system for IE on the basis of resonant DC DC converters is shown in FIG. 5. This converter type is identified in connection with inductive energy transfer as state of the art. Besides this further converter types on the basis of transformers can be thought of (flyback, forward, CUK, asymmetric half bridge etc). The input voltage $V_i$ is cut up by a switch bridge 106 into a high frequency AC voltage. This switch bridge 106 consists of a half bridge, respectively full bridge, wherein semiconductor switches as active components are deployed. This AC voltage is applied to the primary side of the loosely coupled transformers 110. For compensating the comparably high reactive components of the transformers, further reactive components are provided on the primary side and the secondary side which are schematically depicted as resonant circuits 108 and 112. As a general rule, a serial capacity is integrated in the primary side although further reactive components can be provided for purposefully manipulation of the frequency properties of the primary circuit.

On the secondary side usage of additional reactive components can be omitted (LLC) although further capacities for compensating the main inductions of the conductor can be used (LLCC) in parallel as well as in serial circuits. Moreover, usage of additional reactive components is possible again for purposefully manipulation of the frequency characteristics of the secondary side.

The secondary current is rectified on the output side. The rectification 114 can be carried out as half way rectification or full way rectification, the components can be regular diodes as well as semi-conductor switches (synchronous rectification). The rectified output current is smoothed with the help of the filter 116 (optional with an inductivity). The present state of the art uses a feedback signal in order to realize a comparison of the nominal value and actual value, for example in order to follow up the switching frequency as a control variable of the controlled system in case of a resonant converter.

There are other technical approaches allowing for the omission of the signal feedback in case of a resonant converter by a restricted choice of the bias point. These are based on the determination of the switching frequency to a constant value. In order to limit the variation of the input voltage at different coupling ratios in these approaches it is suggested to carry out the operation at a so called "coupling independent point" a bias point at which under condition that the resistive charging of the source is equal, an approximately equal output voltage is achieved.

Often these determined special bias points are based on simplified calculation methods. If one examines the adjusted output voltage in view of the charging for different spaces for a system for IE in more detail, one obtains the characteristic trend as shown in FIG. 6. Here for each switching frequency of a half bridge the appearing output voltage under workload of the output voltage with the nominal output power of the system is determined. Additionally, the open circuit voltage is shown dashed.

As can be seen from these trends, this characteristic property of a coupling independent point for the shown exemplarily chosen system is indeed comprehensible (choice of switching frequency at $f_s \approx 48$ kHz for $I_G=3$ mm and $I_G=6$ mm) although in a practical system being available only under significant constraints. Hence it is apparent that for poor coupling conditions in the chosen example for $I_G=8$ mm the property of a preferably constant output voltage is lost. Moreover, a variation of the value of the output voltage occurs when the output is loaded with a capacity different from the nominal capacity especially in case of idle running occurring in almost every application.

By using the inventive concept described in the following embodiments, several problems in view of the technical realization of a system for IE are eliminated. By using a feedback signal the associated signal path has to be realized either separate or has to be integrated with significant influence on the construction of the magnetic coupling in the principle energy current path. Both solutions result in increased technical complexity. By using the concept described herein it can be provided for an optimal mechanical and electrical construction of the total system in view of the energy transfer by omission of the signal feedback.

A further technical problem arises from the exploitation of the coupling independent bias point. On the one hand, an interval comprising an intercept point of the upper voltage for the distances $I_G=3$ mm and $I_G=6$ mm can be recognized from the chosen example of FIG. 6 in an interval between 45 and 50 kHz. However, as soon as the distance is increased, the magnetic coupling decreases such that the coupling independence is lost. This holds in principle for each and every system for IE.

On the other hand, a variation of the output voltage occurs when the initial load is changed in case the switching frequency is chosen, as fixed value as follows from the intersection point of the dashed trends shown in FIG. 6. Accordingly, this special bias point can be used in a limited way only in view of a preferably constant output voltage. Especially a direct supply of sensitive charges with a narrow value range of the allowed load voltage is impossible when choosing a fixed value of the switching frequency.

If one considers a further important aspect of a system for IE operating at a fixed frequency besides the variation of the output voltage, namely the occurring leakages from FIG. 7, one notices that establishing the operating frequency in the left regime of FIG. 6 is disadvantageous. A variation of the occurring leakages independent of the distance is greatest in the regime of low voltage variations (the coupling independent point).

The level of efficiency of the system for IE accordingly reacts very sensitive to variations of the distance in this regime. Consequently, for systems that make use of the coupling independent point, the positioning is significantly constrained and another aspect of the level of efficiency has to be paid attention that no too significant variations of the distance from the nominal distance are possible.

However, if a switching frequency is chosen in the regime of the steepening to the anti-resonance frequency (for the exemplarily chosen example at 65 up to 70 kHz) a plurality of advantages in view of the trend of the power loss occur. On the one hand, the absolute value of the occurring power loss in this regime is smallest for great distances of the shown example. On the other hand, the variation of the level of efficiency is significantly smaller in this regime. This effect is re-enforced for the efficiency of the partial load once more as can be seen from FIG. 8 at a charging of the source with 20% of the nominal output.

Due to the restriction of the possible switching frequency to the special position of the coupling independent bias point, significant restrictions in view of the performance of the overall system occur which can be circumvented by using the present invention. Exploitation of the coupling independent bias point nevertheless results in an inherent variation of the output voltage. The presence of a certain fluctuation range of the output voltage of the resonant level does not fulfil the requirement for the necessary stability of the output voltage for supplying modern power electrical loads. Thus, exploitation of the "coupling independent point" is only possible for a strongly restricted class of energy consumers on the secondary side. In modern usage scenarios, however, the voltage variation of the supply voltage of those loads becomes inadmissibly great even when using this special bias point. Not least, attention has to be paid to the variation in case of charging applications based on Li-ion technology.

SUMMARY OF THE INVENTION

Therefore, the present invention is based on the concept of omitting a signal feedback by abandoning the requirement of a stabilized output voltage. The resonant stage is operated at a fixed frequency in this case wherein the choice of the switching frequency in contrast to the known approaches can happen basically arbitrarily. In view of minimal power losses, an excellent optimum exists for this parameter, however, as can be seen in the above explanations. The free choice of the switching frequency therefore simplifies the construction of the resonant converter state significantly. Furthermore, this approach allows for purposeful, optimal construction of this stage.

In order to nevertheless allow for supply of sensitive loads on the secondary side the present invention suggests an extension to a two-stage concept. Therein, the second stage serves for conditioning the output voltage $V_O$ on the secondary side. The block wiring diagram of such subsequent stabilization is shown in FIG. 9.

The present invention allows in an advantageous manner to completely abstain from a separated signal feedback in order to configure the construction of the magnetic coupling between primary side and secondary side technically as simple as possible. Thus the construction can be made with a maximum possible priority for the energy transfer and no technical trade-offs have to be accepted and no sophisticated demodulation wirings have to be taken into account.

From the thesis Schwalbe, Ulf: "Vergleichende Untersuchungen dreistufiger Schaltnetzteil Topologien im Ausgangsleistungsbereich bis 3 kW", Dissertation, TU Ilmenau, September 2009, it is known to apply multistage topologies in switching power supplies with fixed coupled transformers.

The discussed approach of a three-stage switching power supply in this thesis follows the approach of overcoming the problems of the construction of a classic switching power supply (SNT) including two stages by adding a third stage. Herein, especially the relationship between the size of the intermediate circuit electrolyte compensator for the compliance of a specific dwelling time and the necessary input voltage interval of the DC-DC stage are taken into account. Moreover, in general, it is to the detriment for the efficiency of the DC-DC converter if said converter has to cover a large input voltage interval since this requirement results in extensive limitations to the construction.

In contrast to the provided problems, the resonant LLC converter is only utilized in order to ensure the ZVS operation of the so-called "electronic transformers". During application of inductive energy transfer, however, no such classical transformer in which the air gap can be adjusted between virtually zero and a maximum value in a fixed way. Rather, it is about loosely coupled inductors which can be brought closer to one another up to a minimal distance. Said distance is not adjustable up to an arbitrary small value. Accordingly, a developer of a system for inductive energy transfer has to cope with a very small magnetisation inductivity $L_M$ as well as a very high scattering inductivity $L_{res}$ even under optimal conditions. Moreover, due to the mechanical tolerances when producing the device parts as well as the positioning of said parts in relation to one another, variable distances occur even during operation while the air gap from the dissertation Swalbe represents a fixed value which is chosen purposefully during the design phase. The application of the inductive energy transfer results in only topologies being reasonably usable which can cover significantly varying states of the loosely magnetic coupling. Such a topology is for example the resonant LLCC converter.

The present invention therefore suggests a wiring for a system for contactless inductive energy transfer, especially for application in energy supply of mobile devices. A primary side circuit is arranged on a primary side and is compoundable with a primary side supply voltage and a secondary side circuit is arranged on a secondary side and compoundable with a load that is to be supplied with energy.

According to the present invention, a conductor stage with galvanic separation for contactless transfer of energy from the primary side over an air gap to the secondary side is provided wherein at least two magnetically coupled inductors for inductive energy transfer are provided which are separable via moving the secondary side from the primary side spatially from one another. The conductor stage has a resonant converter and the secondary circuit further includes a subsequent stabilizing stage.

The subsequent stabilizing stage according to the present invention can be provided as a simple linear regulator or as a clocked switching power supply shown in FIGS. 10 and 11. Furthermore, a simplified over voltage limitation can be thought of as only "voltage regulation". Both the linear regulator and the switching power supply for subsequent stabilization can be realized as integrated modules or can be constructed as discrete components.

BRIEF DESCRIPTION OF THE DRAWINGS

For a better understanding of the present invention, said invention will be explained with reference to the embodiments depicted in the subsequent figures. Therein equal parts are provided with equal reference signs and equal component labels. Furthermore, particular features or combinations of features from the depicted and described embodiments can provide individually seen independent inventive solutions or solutions according to the invention.

In the figures,

FIG. 1 shows a schematic depiction of the principle partition of a system for inductive energy transfer;

FIG. 2 shows a schematic depiction of the exchange of information between the base and the mobile part over a separately provided information channel;

FIG. 3 shows a schematic depiction of the exchange of information between the base part and the mobile part over the same magnetic coupling as used for the energy transfer itself;

FIG. 4 shows a schematic depiction of the exchange of information between the base and the mobile part by radio;

DETAILED DESCRIPTION

The present invention will be described in detail with reference to figures.

The central idea of the present invention is the realization of a system for IE based on the two- or three-stage concept. This approach renders the transmission of information for regulating the load voltage between the primary and secondary side redundant. In particular, three stages are provided:

1$^{st}$ stage: Processing of the input voltage (AC/DC respectively DC/DC). Depending on the application this stage is optionally.

2$^{nd}$ stage: Energy transfer via an air gap.

3$^{rd}$ stage: Subsequent stabilizing.

For the application of a clocked power supply for subsequent stabilizing a plurality of DC-DC converters are possible especially in this context the buck inverter, the buck-boost converter the CUK converter as well as the boost converter are to be named. Further, galvanically separated converters like the fly back or forward converter as well as the load resonant or switching resonant converter can be applied. For extremely insensitive loads, also a simple over-voltage limitation can be provided.

Figure 5:
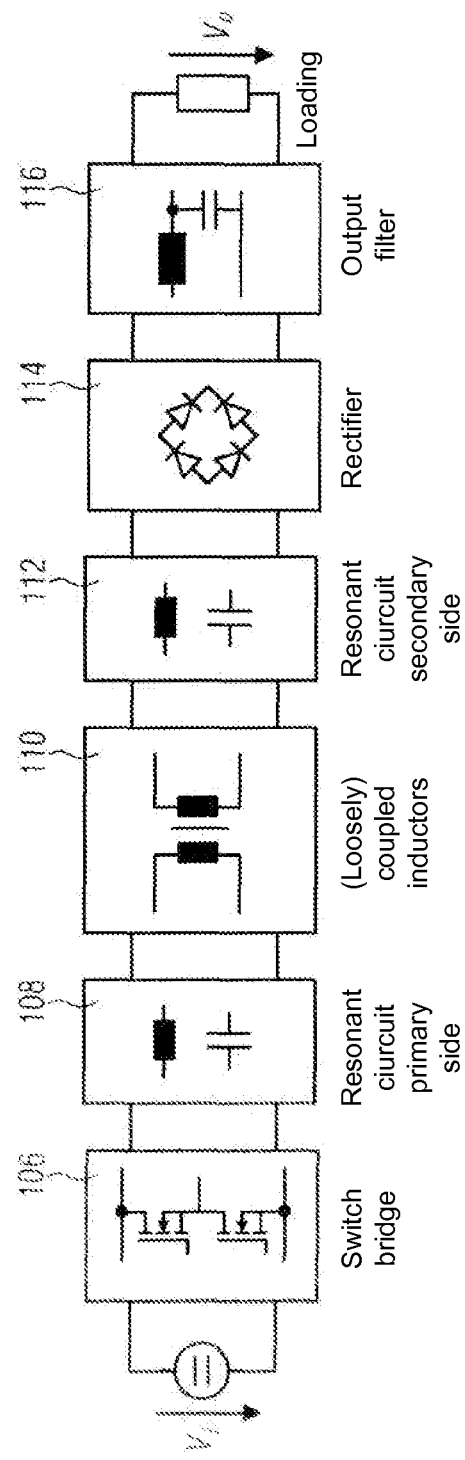
FIG. 5 shows a schematic depiction of the basic construction of a system for inductive energy transfer on the basis of a resonant DC/DC conductor.
Figure 6:
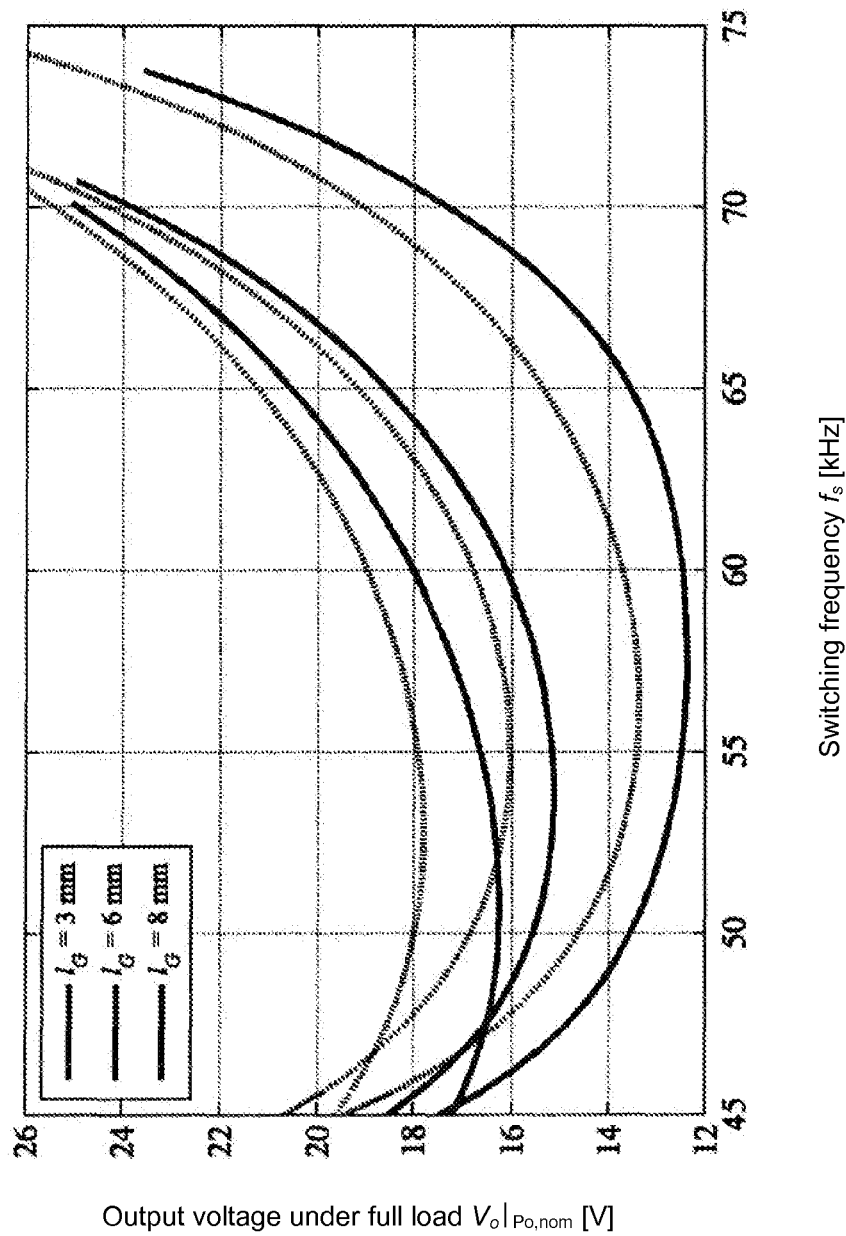
FIG. 6 shows simulated trends of the output voltage of a system for IE on the basis of an LLCC converter for different distances of the device parts during load of the source with nominal capacity as a function of the switching frequency (solid line: output voltage under-load with nominal output power, dashed line: output voltage in idle state)
Figure 7:
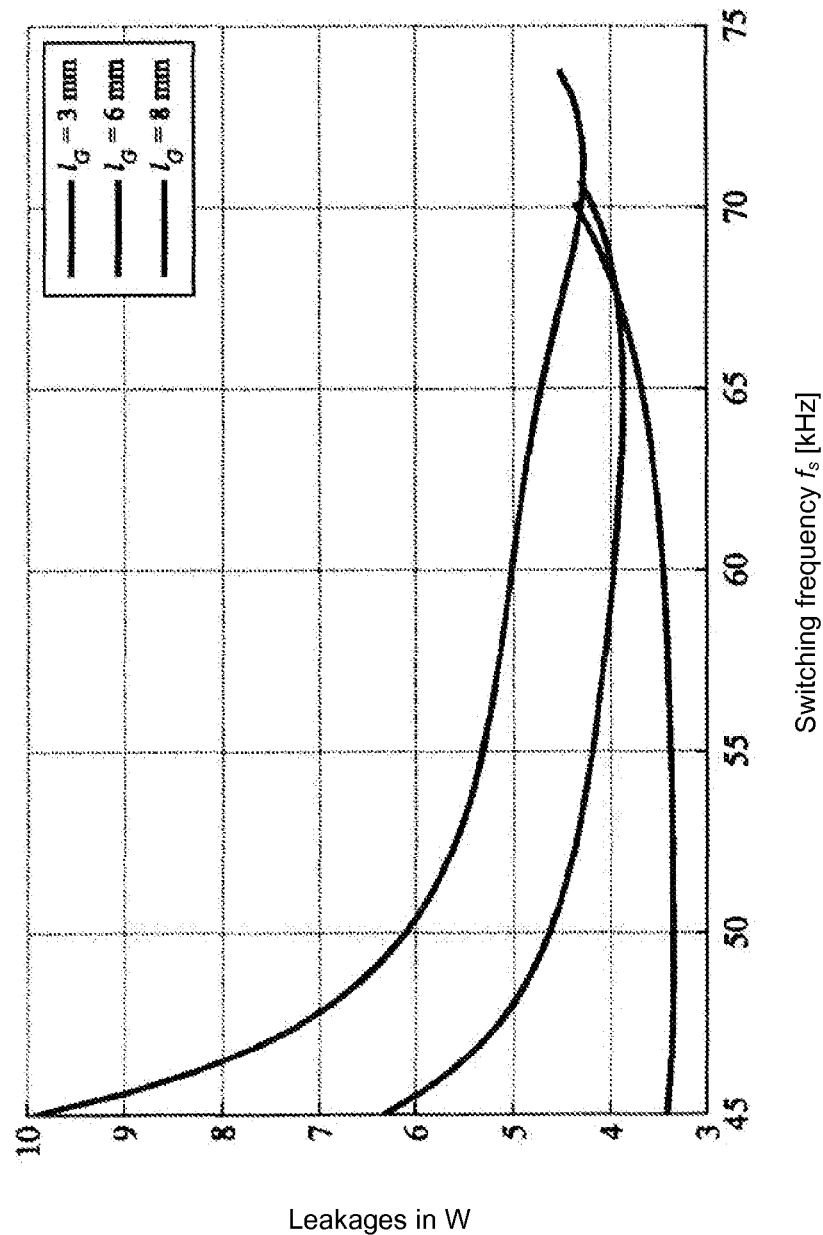
FIG. 7 shows simulated trends of the power loss of a system for IE on the basis of an LLCC converter for different distances of the device parts during load of the source with nominal capacity as function of the switching frequency.
Figure 8:
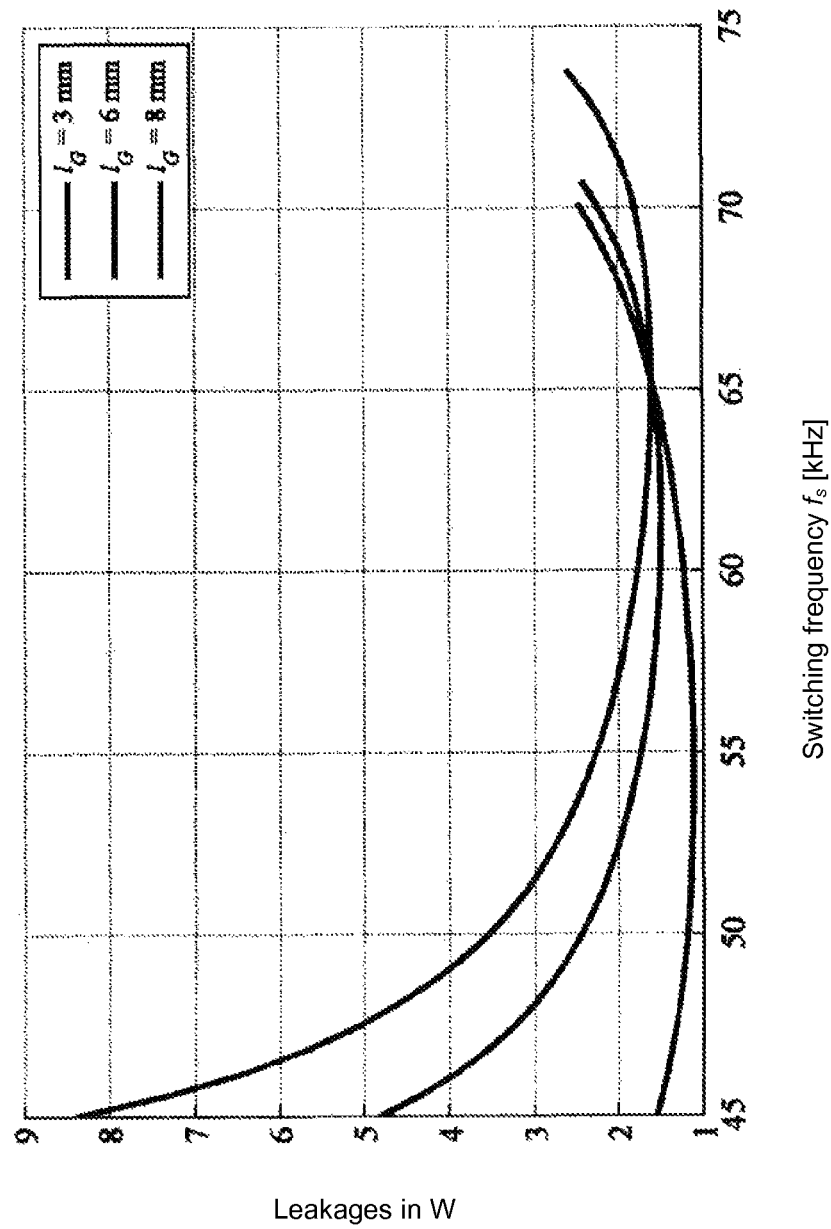
FIG. 8 shows simulated trends of power loss of a system for IE on the basis of an LLCC converter for different distances of the device parts during load of the source with 20% of the nominal capacity as a function of the switching frequency.
Figure 9:
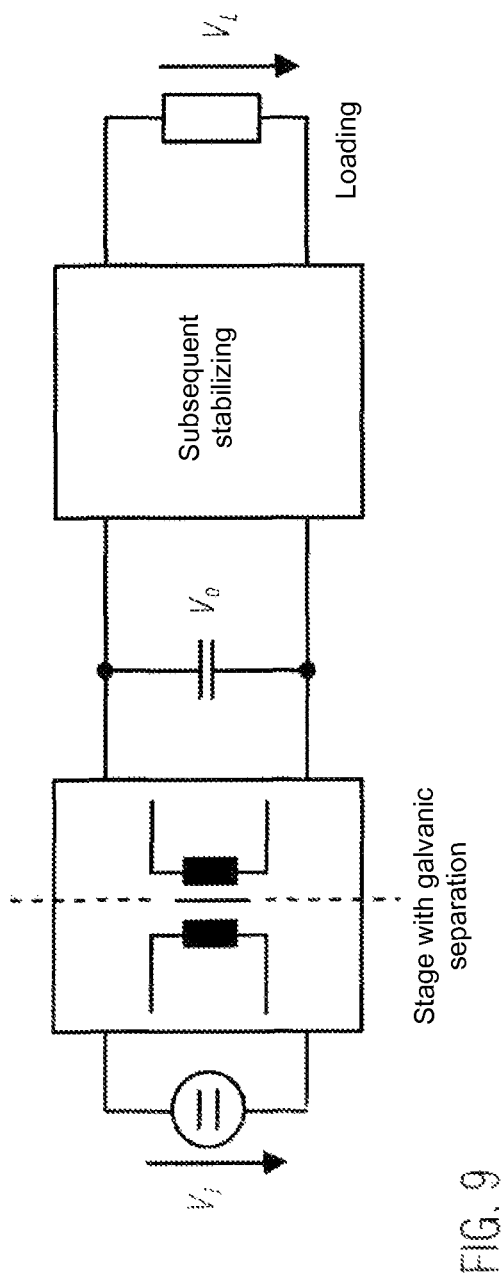
FIG. 9 shows a schematic depiction of a two-stage system structure according to the present invention.
Figure 10:
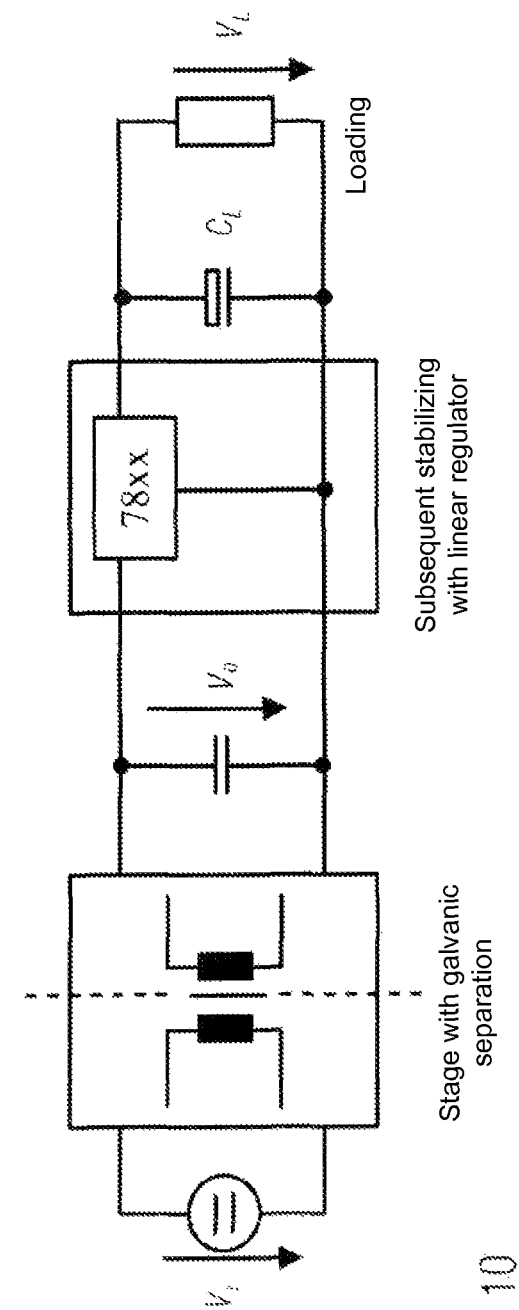
FIG. 10 shows a schematic depiction of a circuit configuration with subsequent stabilizing stage based on a linear regulator.
Figure 11:
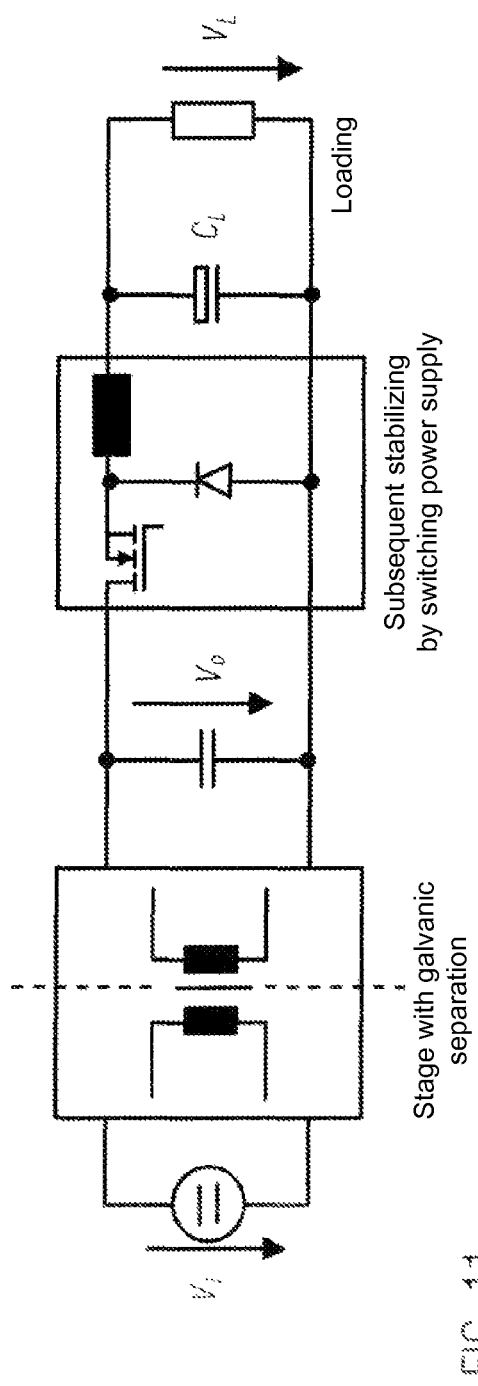
FIG. 11 shows a schematic depiction of a circuit configuration with a subsequent stabilizing stage based on a switching power supply with a buck convertor.

Overcoming of the air gap can advantageously happen by the resonant converter amongst other already-mentioned realizations, as shown in FIG. 5. Herein a plurality of different approaches exists, by which means the parasitic properties of the loosely coupled transformers can be compensated. On the primary side and on the secondary side, serial respectively parallel compensation can be carried out (condensator). On the secondary side, however, condensation can also be omitted. Additionally, further reactive components for purposeful manipulation of the frequency properties of the resonant circuit can be provided.

Figure 12:
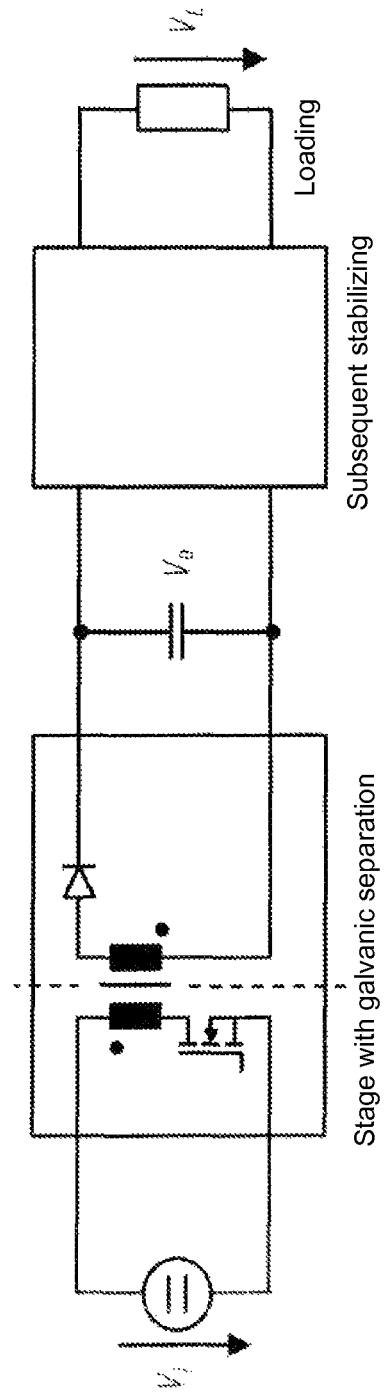
FIG. 12 shows a schematic depiction of a circuit configuration in which the air gap is overcome with the help of a flyback converter.
Figure 13:
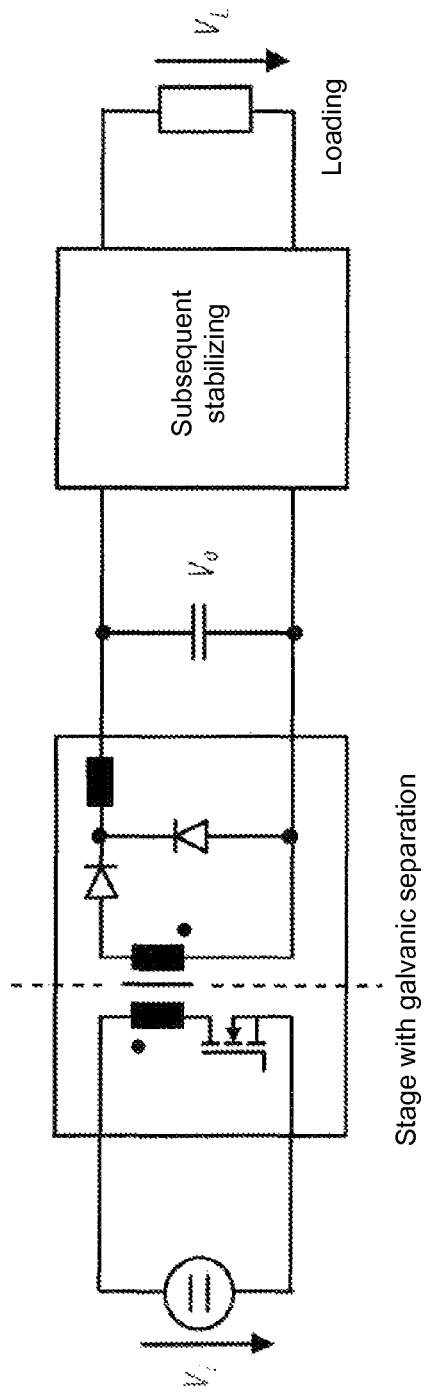
FIG. 13 shows a schematic depiction of a circuit configuration in which the air gap is overcome with the help of a forward converter.

Moreover, further topologies for overcoming the air gap in the case of comparably loosely coupled inductors which occur in the IE as a rule can be thought of. Thus, despite the significantly spread inductivity of flyback converter (potentially as two-switch variant therein) or a forward converter could be deployed as illustrated in FIGS. 12 and 13.

Figure 14:
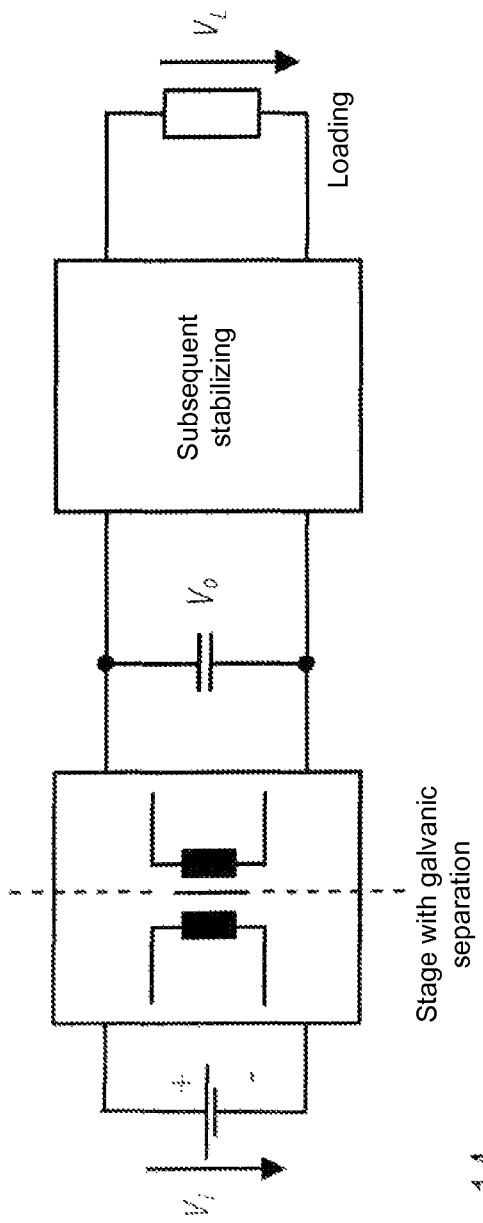
FIG. 14 shows a schematic depiction of a circuit configuration in which the potential-separated stage is supplied from a battery.

Generation of an input voltage $V_i$ of the resonance stage is also possible in many ways. On the one hand this DC voltage can be provided directly through a battery respectively a DC-DC converter as depicted in FIGS. 14 and 15.

Figure 15:
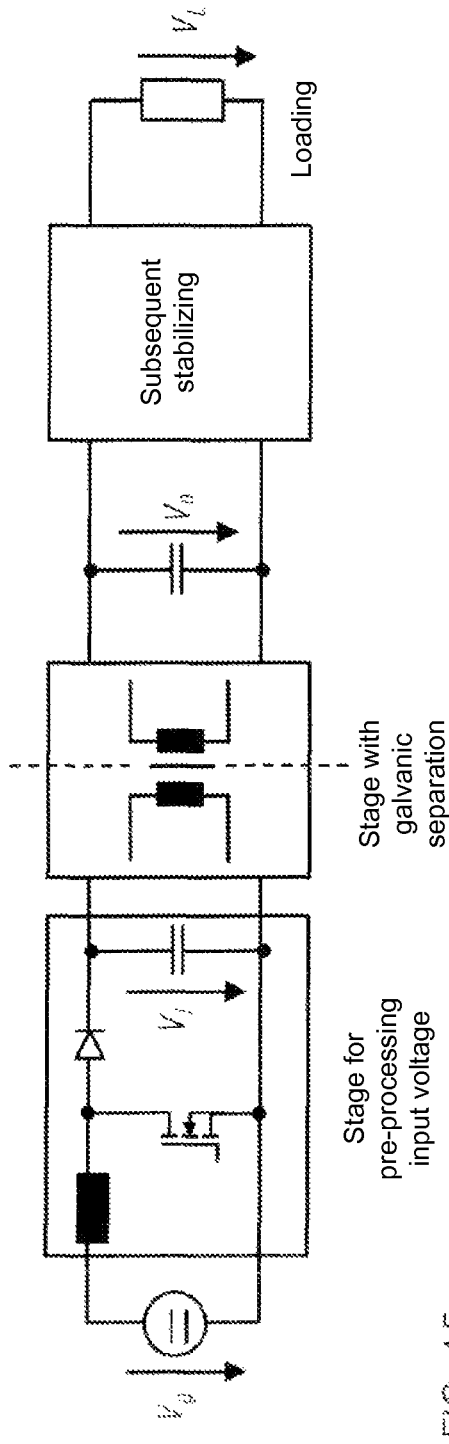
FIG. 15 shows a schematic depiction of a circuit configuration in which the potential-separated stage is supplied by a boost converter.

Alternatively to the exemplarily depicted boost converter in FIG. 15, different DC-DC converters can be deployed here as well (buck, buck-boost, flyback, forward, CUK etc.). In case the input voltage $V_i$ is not provided as AC voltage systematic said input voltage has to be pre-processed from another source voltage as illustrated in FIG. 15. According the proposed concept of a two-stage overcoming of the air gap requires as a rule a third stage for pre-processing of the input voltage.

The DC voltage $V_g$ can beyond that be generated by a rectifying of the line voltage with the help of a bridge rectifier including a storage capacitor.

Figure 16:
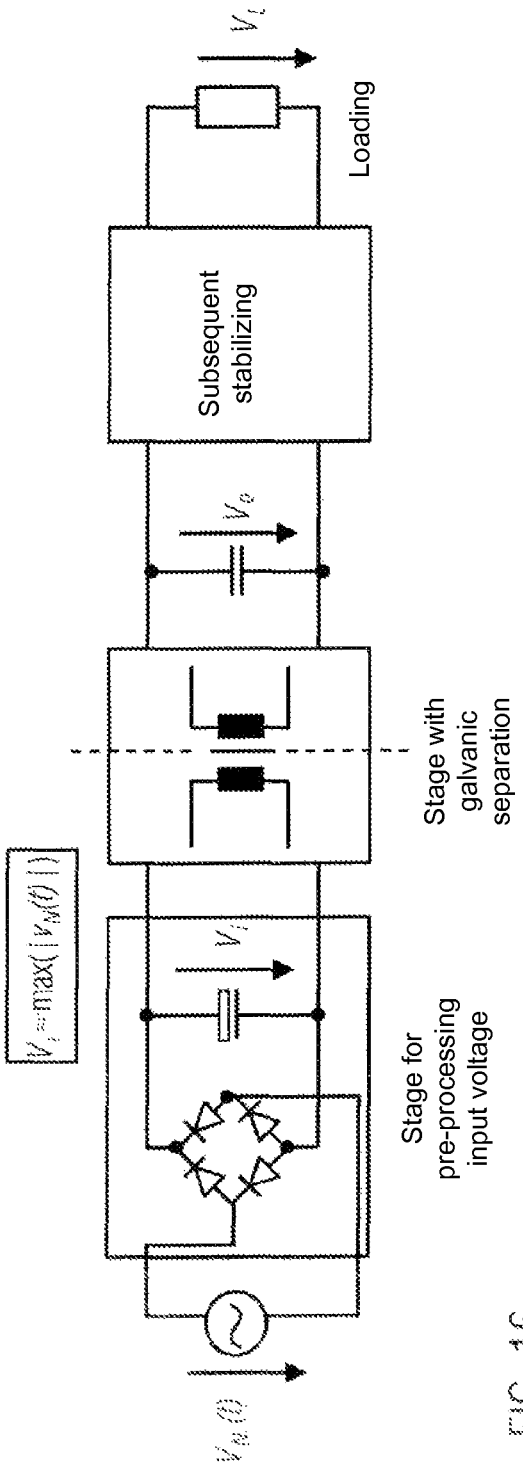
FIG. 16 shows a schematic depiction of a circuit configuration in which the input voltage of the potential-separated state is treated with the help of a rectifier.

The opportunities from FIGS. 15 and 16 can be combined correspondingly. The rectified and smoothed line voltage serves as input voltage of a DC/DC converter in this case which compensates the resulting residual ripple (power frequency) and stabilizes the output voltage. This stabilized DC voltage serves as input voltage for the converter stage for overcoming the air gap. Accordingly, other topologies as for example the back converter can be used besides the boost converter depicted in FIG. 15. In order to improve the power supply side power factor furthermore a passive power factor correction can be provided (smoothing inductor). Moreover, an active power factor correction can function in order to generate $V_i$.

Figure 17:
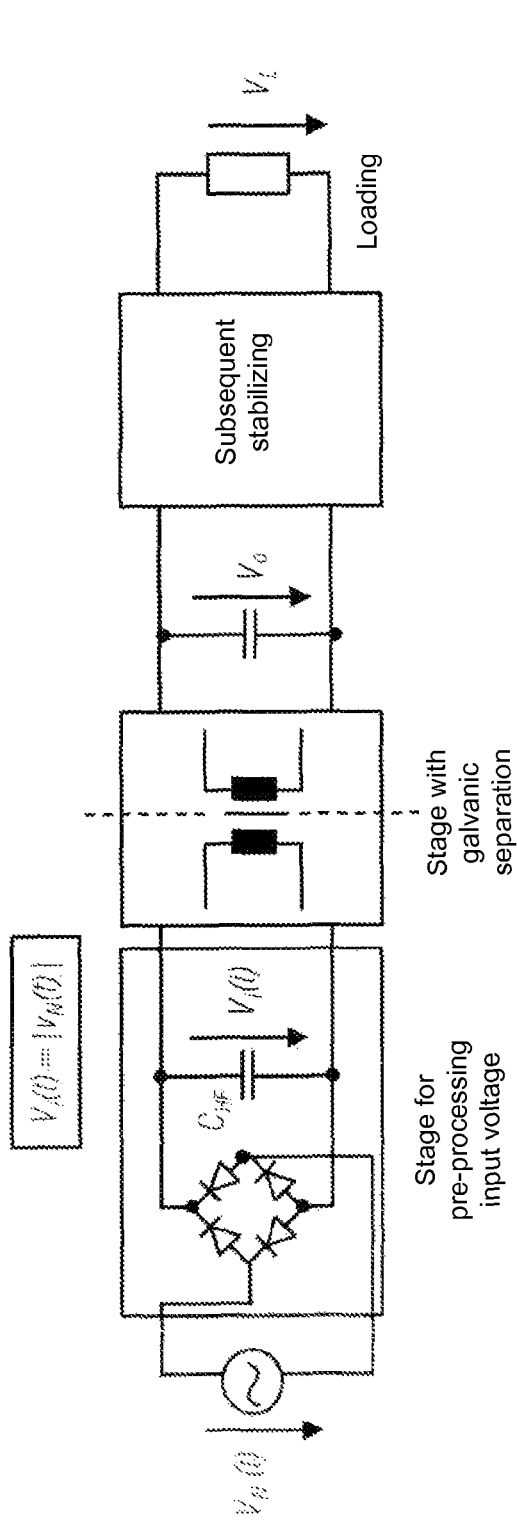
FIG. 17 shows a schematic depiction of a circuit configuration in which the potential-separated stage is operated as "electronic transformer" for IE and simultaneously raises the power supply sided performance factor.

Alternatively, the resonant intermediate state can be supplied directly from an rectified AC power supply as schematically depicted in FIG. 17. Said power supply operates with a fixed frequency as electronic transformer and additionally improves the power supply sided power factor in comparison to a rectifier bridge in combination with a storage capacitor, the depicted condensator $C_{HF}$ has a small nominal value. It can therefore in contrast to the storage capacitor (electrolyte condensator) not buffer a significant amount of energy but only serves for filtering the high-frequent harmonic of the input current of the converter stage for overcoming the air gap. In this approach, in addition to the distance-dependent variation of the DC value the voltage ripple of initial voltage $V_0$ emerges having a double-supply frequency. This residual ripple is compensated in turn by the subsequent stabilizing stage on the secondary side in this embodiment.

Subsequent preferred embodiments of the inventive circuit configuration are explained in detail with reference to the FIGS. 18 to 24.

Figure 18:
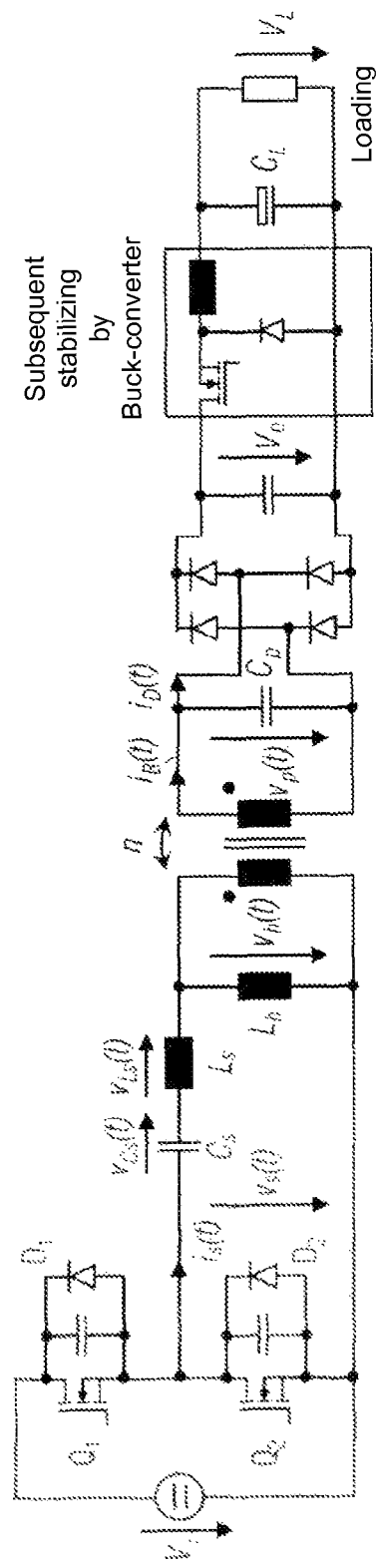
FIG. 18 shows a schematic depiction of a circuit configuration according to an advantageous embodiment in which the potentially separated stage is realized by means of a resonant LLCC converter and the subsequent stabilizing is provided with the help of a buck converter.
Figure 19:
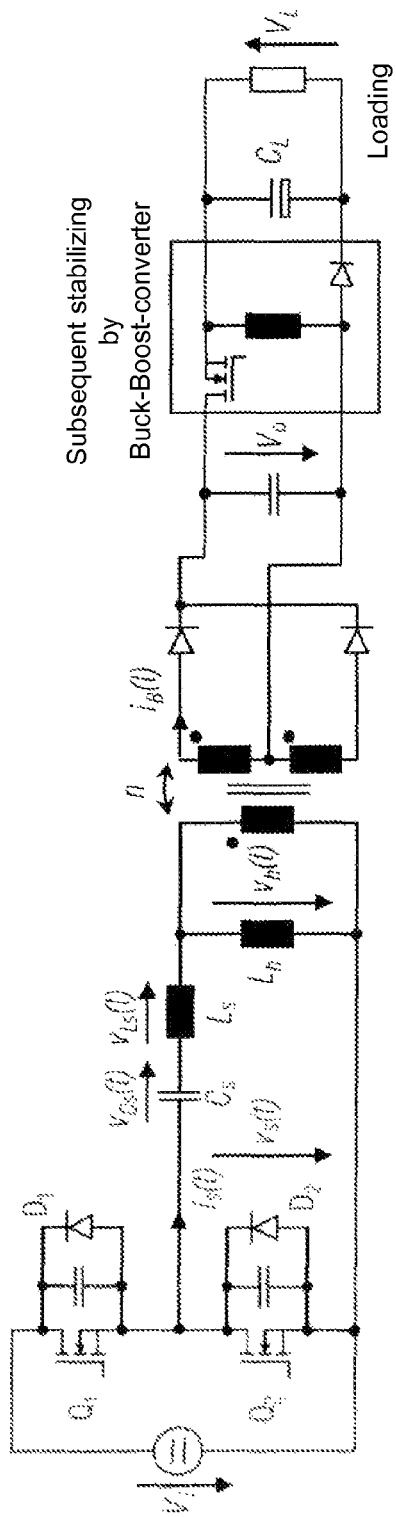
FIG. 19 shows a schematic depiction of a circuit configuration according to a further advantageous embodiment in which the potentially separated stage is realized by means of a resonant LLC converter and a mid point tapping on the secondary side, and the subsequent stabilizing is provided with the help of a buck-boost converter.
Figure 20:
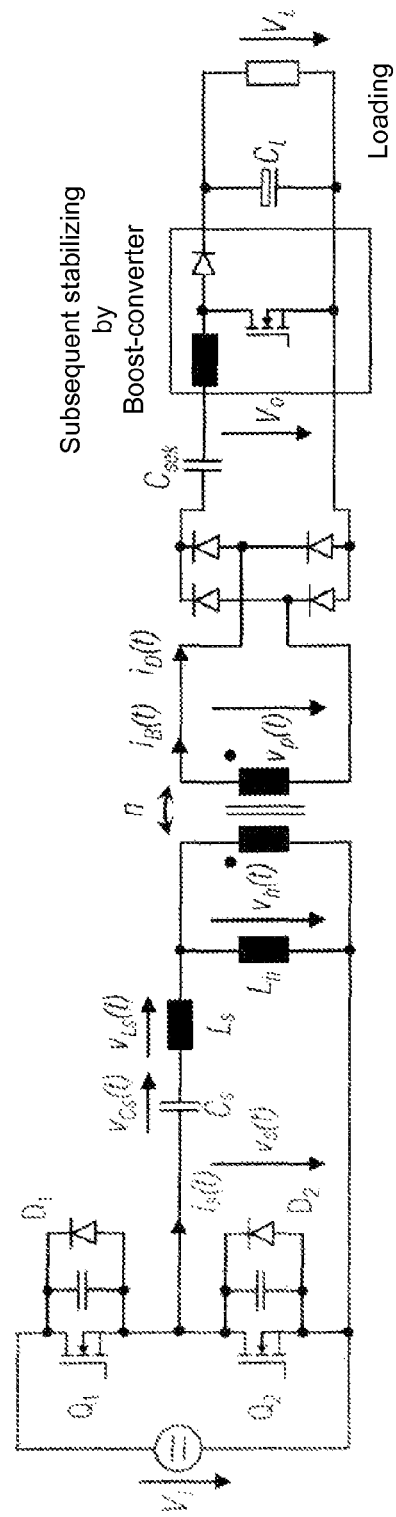
FIG. 20 shows a schematic depiction of a circuit configuration according to an advantageous embodiment in which the potentially separated stage is realized with the help of a resonant LLCC convertor and the subsequent stabilizing is provided with the help of a boost converter.

As preferred embodiment for overcoming the air gap resonant converters were identified. Preferred fundamental structure of the resonant circuit are shown in FIGS. 18 to 20, the construction of the resonant circuit of the resonant converter is in this case due to the presence and the placement of a condensator on the secondary side. In case of secondary sided parallel compensation, utilization of a full bridge for rectification is advantageous, otherwise the secondary side can also be provided as central tapping (see FIG. 19) in order to minimize the occurring diode leakages.

The subsequent stabilization is realized in FIG. 18 by a back converter. In FIG. 19 a buck-boost converter was chosen as topology for the subsequent stabilizing. Moreover a boost converter is applicable as shown in FIG. 20.

In view of the pre-processing of the input voltage, FIGS. 21-24 show preferred realizations each with reference to the example of the secondary sided parallel compensated LLCC converters. The subsequent stabilizing stage is exemplarily realized with the help of a buck converter although, as already discussed, different variations of subsequent stabilizing can be deployed. Likewise, different resonant circuit topologies are possible.

Figure 21:
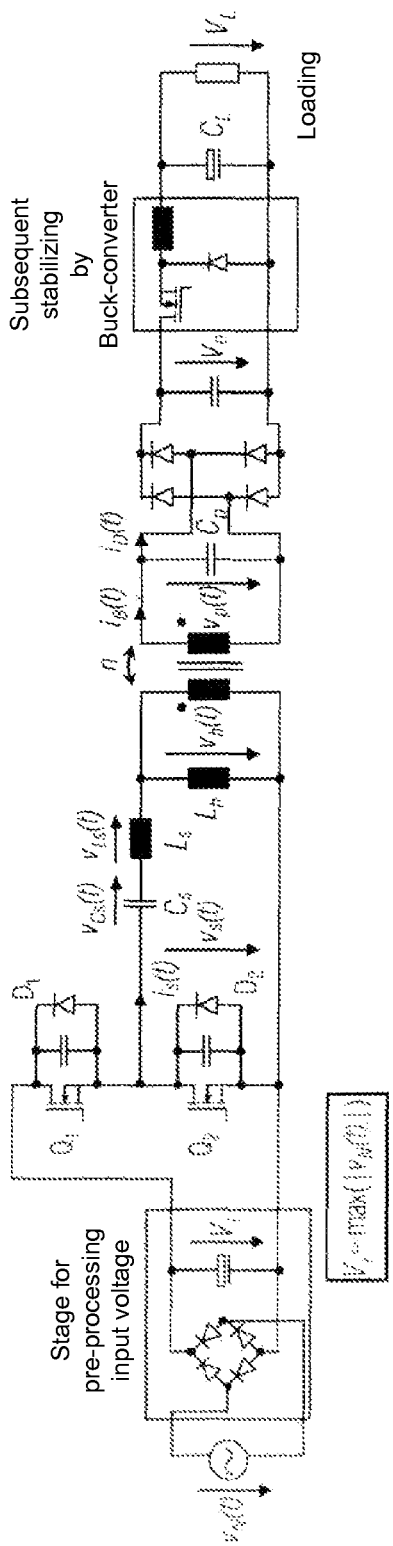
FIG. 21 shows a schematic depiction of a circuit configuration in which the input voltage of the potential-separated state is provided with the help of a rectifier and a storage capacitor.

In FIG. 21 the pre-processing of the line voltage on the input side happens with the help of a simple rectifier bridge in connection with a storage capacitor. Said storage capacitor smoothes the line voltage and charges the line voltage up to the peak in a first approximation. The resulting voltage ripple of the secondary sided initial voltage $V_0$ of the resonant stage is regulated by the subsequent stabilizing (in addition to the voltage variation because of different positional relationships).

Figure 22:
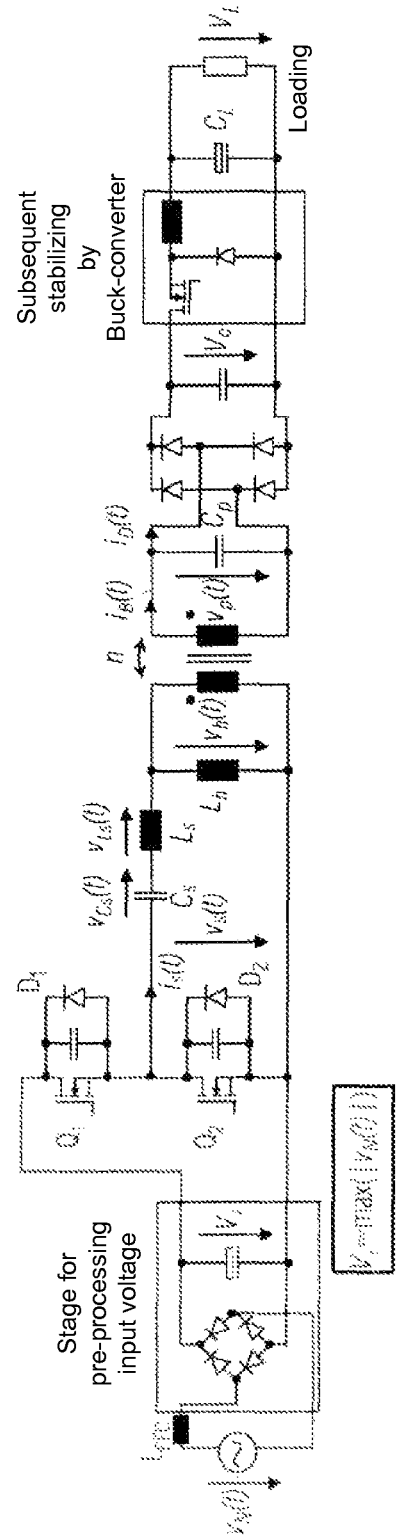
FIG. 22 shows a schematic depiction of a circuit configuration in which the input voltage of the potential-separated stage is provided with the help of a passive power factor correction.

In order to increase the supply line sided power factor a passive power factor correction (PFC) can be provided as schematically depicted in FIG. 22. Therein the recharging pulses are broadened by additional impedances (as a rule inductive) whereby the absorbed distorted idle power decreases and the power factor increases. As a passive PFC especially the smoothening inductor $L_{PFC}$ serves.

Figures 23, 24:
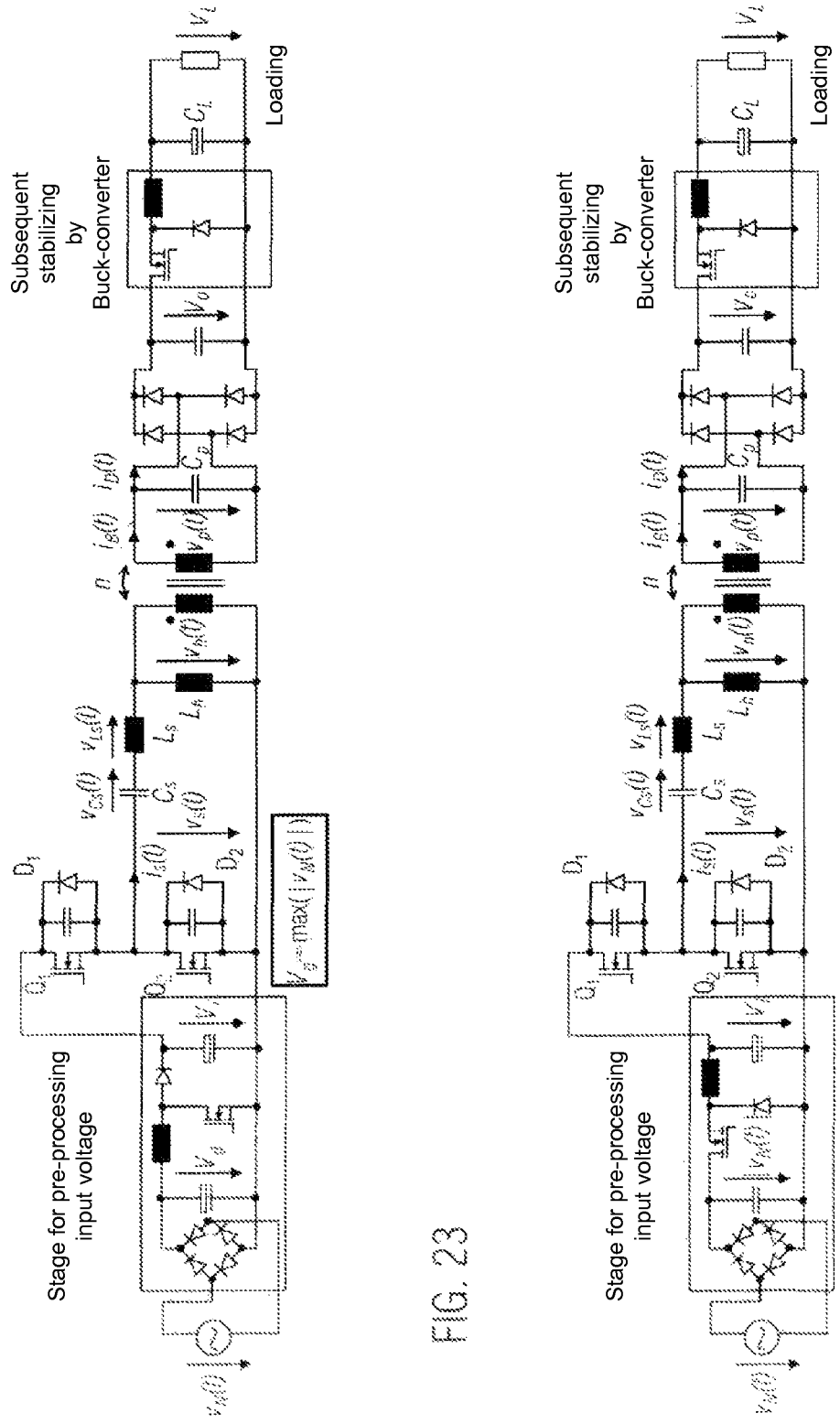
FIG. 23 shows a schematic depiction of a circuit configuration in which the input voltage of the potential-separated state is provided with the help of a DC-DC converter.
FIG. 24 shows a schematic depiction of a circuit configuration in which the input voltage of the potential-separated state is provided with the help of an active power factor correction.

In order to be able to cover a great value range of the line voltage (wide range input with European and non-European nominal values) an additional DC-DC stage as shown in FIG. 23 can be provided. Said DC-DC stage operates contrary to an active power factor correction circuit as DC-DC converter and accordingly has to be dimensioned for the nominal power output. In the provided figure, a boost converter was exemplarily chosen.

In order to purposefully optimizing the power factor on the supply side towards high values, an active power factor correction can be provided as depicted in FIG. 24. Thereby recalls can be made to a buck converter, alternatively, utilization of boost converters as in FIG. 23 as well as other topologies is possible as well.

In summary, it is to be noted that the realizations in FIGS. 18-24 including the described modifications of the topology are almost arbitrarily combinable.

The invention claimed is:

1. A circuit for a system for contactless inductive energy transfer, wherein the circuit comprises:
   a primary side circuit being arranged on the primary side that can be connected to a supply voltage on the primary side, and a secondary side circuit being arranged on the secondary side that can be connected to a load which is to be supplied with energy; and
   a transformer stage with galvanic separation for contactless transfer of energy from the primary side to the secondary side via an air gap, wherein at least two magnetically coupled inductors for inductive energy transfer are provided which are spatially separable from one another by removing the secondary side from the primary side;
   wherein the transformer stage comprises a resonant converter and the secondary side circuit further comprises a subsequent stabilising stage;
   wherein the circuit does not provide any signal feedback of information from the secondary side to the primary side; and
   wherein the subsequent stabilising stage includes a Buck-converter and the transformer stage includes at least one selected from the group of an LLC-converter and an LLCC-converter, the LLC-converter or the LLCC-converter operated at a fixed frequency, the fixed frequency operated converter being supplied by a Boost-converter from a rectified power supply, the Boost-converter being at least one selected from the group consisting of an AC-DC-converter and a DC-DC-converter.

2. The circuit according to claim 1, wherein the circuit is operable such that an output voltage of the transformer stage is maintained in a predetermined value range in case of variations of the load to be supplied, of the supply voltage and/or a distance between the primary side and the secondary side, without providing a continuous feedback of information to the primary side about the output voltage.

3. The circuit according to claim 1, that can be operated such that a switching frequency of the transformer stage is adjusted to a bias point, dependent on at least one electric property of the primary side.

4. The circuit according to claim 1, wherein the resonant converter can be operated with a fixed frequency.

5. The circuit according to claim 3, wherein the resonant converter is operated such that a duty factor of the transformer stage changes dependent on at least one electric property of the primary side.

6. The circuit according to claim 1, wherein the subsequent stabilisation stage is provided such that it can limit a load current and/or a load voltage.

7. The circuit according to claim 1, wherein the subsequent stabilisation stage is provided such that a ripple content of the rectified voltage on the secondary side can be removed at least partly.

8. The circuit according to claim 1, wherein the subsequent stabilisation stage is provided such that its output voltage or its output current is adjustable for sensitive loads.

9. The circuit according to claim 1, wherein the subsequent stabilisation stage is provided such that its power consumption is limited in case of great distances when a significant drop in the DC-voltage on the secondary side occurs.

10. The circuit according to claim 1, wherein the primary side circuit comprises a pre-processing stage in form of a diode bridge for pre-processing of the supply-voltage.

11. The circuit according to claim 10, wherein the primary side pre-processing stage comprises a rectifier bridge and storage capacitor being parallel-connected to an output voltage of the rectifier bridge, wherein a smoothening inductor for raising the power factor is provided.

12. The circuit according to claim 1, wherein the primary side circuit is integrable in a base part and the secondary side circuit is integrable in a mobile part.

13. A circuit according to claim 1, adapted to charge at least one rechargeable accumulator.

* * * * *